United States Patent
Feldmann

[11] Patent Number: 6,053,205
[45] Date of Patent: Apr. 25, 2000

[54] VALVE ARRANGEMENT

[75] Inventor: Joachim Feldmann, Neustadt, Germany

[73] Assignee: Wabco GmbH, Hannover, Germany

[21] Appl. No.: 09/209,352

[22] Filed: Dec. 11, 1998

[30] Foreign Application Priority Data

Dec. 17, 1997 [DE] Germany ............................ 197 56 000

[51] Int. Cl.⁷ ........................ F16K 31/122; B60T 15/06
[52] U.S. Cl. ........................ 137/627.5; 303/54; 303/52
[58] Field of Search ........................ 137/627.5; 303/14, 303/13, 20, 3, 15, 50, 52, 54

[56] References Cited

U.S. PATENT DOCUMENTS 3,479,096  11/1969  Cruse ................................. 137/627.5
4,050,746   9/1977  Durling .............................. 137/627.5
5,337,788   8/1994  Nelson .............................. 137/627.5

Primary Examiner—Denise L. Ferensic
Assistant Examiner—Joanne Y. Kim
Attorney, Agent, or Firm—Proskauer Rose LLP

[57] ABSTRACT

An arrangement for use with a valve system permits facilitated adaptation to conditions where modified lever ratios are desired while an actuation force requirement remains unaffected, or where a modified actuating force requirement is desired while lever ratios remain unchanged. In order to avoid or reduce costs associated with modification of the actuation force requirement of the valve system, a spring is provided which acts upon an operating element thereof, in addition to a pressure force, and codirectional therewith, against the actuating force in such manner that a predetermined actuating force requirement results. The invention finds particular significance in applications directed to vehicle braking systems.

7 Claims, 2 Drawing Sheets

VALVE ARRANGEMENT

BACKGROUND OF THE INVENTION

The present invention relates to a valve arrangement for use with a valve system regulating delivery of a pressure medium, and more particularly, an arrangement which permits facilitated adjustment of a force required to actuate such a valve system.

A known such valve arrangement is disclosed, for example, in the WABCO Westinghouse publication "Motorwagen-Bremsventil (Motor Car Brake Valve) 461 106 Page 1," August 1973 edition, and in which a pedal serves as an operating element for brake actuation. A similar system is also disclosed in EP 0 241 437 A1 (corresponding U.S. Pat. No. 4,741,579 entitled "PNEUMATIC DISTRIBUTOR OF THE DUPLEX TYPE FOR MOTOR VEHICLE BRAKING SYSTEMS," issued to Angelillo Domenico on May 3, 1988). In the known arrangements disclosed therein, a supplied pressure exerts a pressure force over an active surface of a graduating piston, and a return spring used to restore the graduating piston exerts a spring force on the actuating element when the valve system is actuated by downward urging of the operating element. During intermittent periods in which the inlet valve of the valve system is opened by operator-actuation, a spring used to ensure secure closure of the inlet valve and a return spring serving to restore a valve body together exert another spring force on the operating element. The actuating force exerted by the operator on the operating element must overcome these forces, or, must resist them in order to maintain continued valve actuation. The combined spring-related biasing forces are low compared to the pressure force. The spring force of the spring which restores the graduating piston is furthermore nearly constant because of its low spring deflection. The actuating force therefore essentially depends on the lever ratios between operating element and valve system, in addition to the value of the pressure delivered at a given time. The evolution of the actuating force as a function of the delivered pressure shall be hereinafter be referred to as the "actuation force requirement."

Often, an application requires a change in these lever ratios, for example due to a change of the length of the operating element, while nevertheless requiring that a value of the actuation force requirement be maintained. Conversely, there are applications requiring a change in the actuation force requirement while the lever ratios remain unchanged. Such applications occur in particular when the installed actuating element is separated from the valve system, as is provided, for example, in the WABCO Westinghouse publication "Motorwagen-Bremsventil (Motor Car Brake Valve) 461 295," August 1973 edition. A comparable system is also disclosed in FIG. 4 on page 6 of the Clayton Dewandre Air Pressure Equipment Brochure "E, E-1, E-2, & DUAL E BRAKE VALVES." In such cases, is not possible to properly adapt the system without changing the diameter of the graduating piston, and therefore not without requiring associated additional changes in the valve system. These changes, which require a redesign of the valve system, result in high development costs. Furthermore, the increased number of versions caused therby contribute to increased manufacturing, material and storage costs, among others drawbacks.

It is therefore the object of the present invention to develop an arrangment of the type mentioned above which permits the actuation force requirement thereof to be adapted to various applications with little or no changes in the valve system.

SUMMARY OF THE INVENTION

In accordance with these and other objects of the invention, there is provided an arrangement for use with a valve system which permits facilitated adaptation thereof to conditions where modified lever ratios are desired while an actuation force requirement is to remain unaffected, or where a modified actuating force requirement is desired while lever ratios remain unchanged. In order to avoid or reduce costs associated with modification of the actuation force requirement of the valve system, a spring is provided which acts upon the operating element, in addition to a pressure force against the actuating force in such manner that a predetermined actuating force requirement results.

Briefly stated, a valve arrangement is provided for the delivery of pressure from a pressure supply, the arrangement including a valve system and an operating element for actuating the valve arrangement by the imparting of actuating force thereto. In such arrangement, the delivered pressure in the valve system exerts a pressure force against the operating element which resists the actuating force thereon. At least one spring which exerts a spring force upon the operating element, in addition to the pressure force thereby assisting the pressure force. The spring force is selected such that a predetermined actuation force requirement is achieved.

Valve arrangements of the type mentioned above are employed in all technical areas in which pressure-operated control systems, in particular pneumatic control systems, are used. Pneumatic vehicle braking systems represent a significant area of application for embodiment of the invention.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
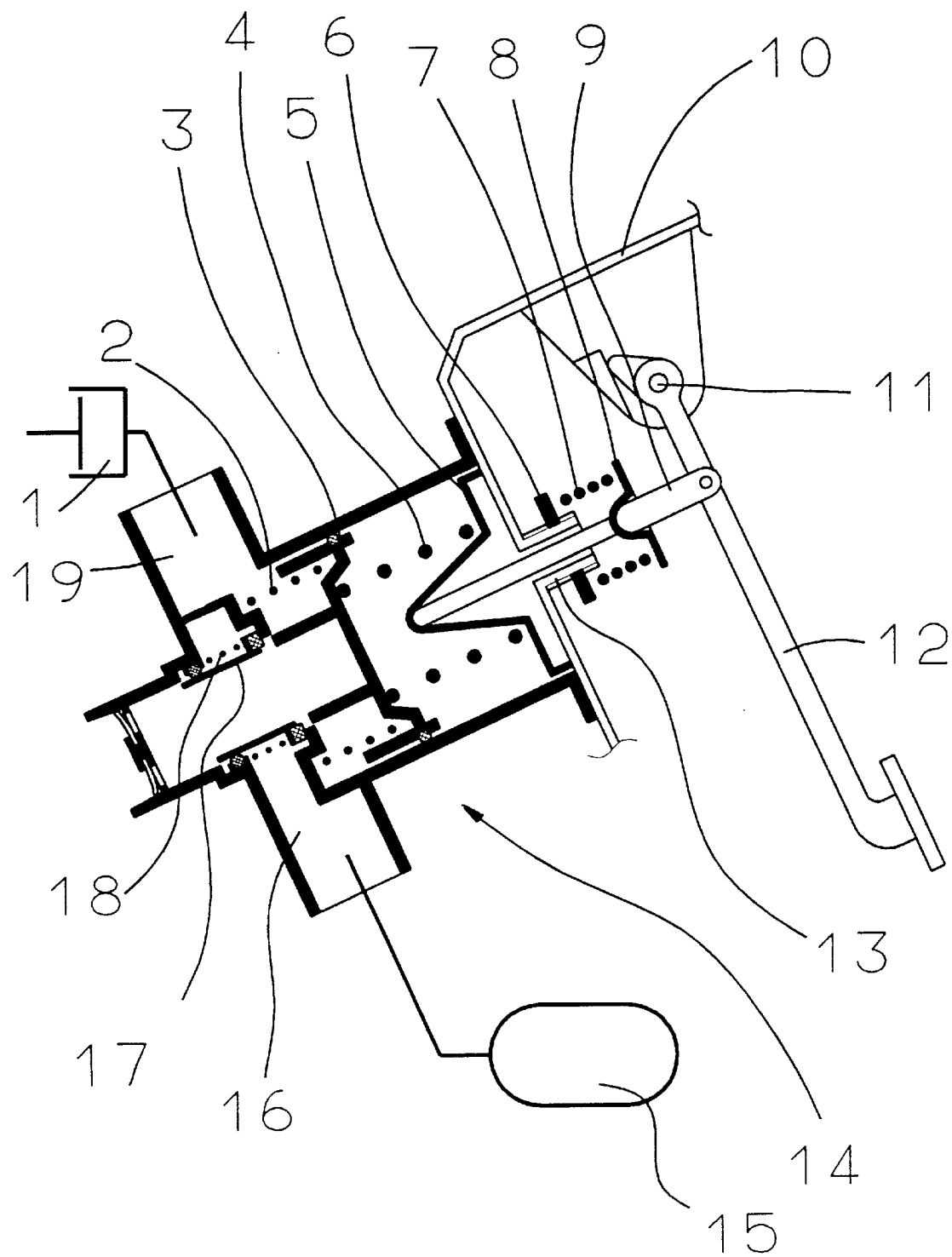
FIG. 1 is a schematic view of a valve arrangement in accordance with an embodiment of the invention.

Referring now to the figures, and in particular FIG. 1, a valve arrangement in accordance with an embodiment of the invention is shown, the valve arrangement including a valve system 14, an operating element 12, a transmission link 9 and a spring 7.

Operating element 12 can be pivotably moved about a bearing shaft 11 to which it is rotatably mounted. Although shown conveniently in the form of a pedal, it is noted that operating element 12 can be provided in various other suitable forms providing analogous function without departure from the invention. It is also acceptable to provide a bearing axle alternative to use of bearing shaft 11. A bearing element 10 serves as a support for valve system 14 and operating element 12, which, in automotive applications, is generally comprised of a part of the floor of a driver's cab or a front structure thereof. In a non-actuated state, operating element 12 is biased in a rest position against a stop carried on bearing element 10 by spring 7 captively disposed between operating element 12 and bearing element 10. In the embodiment as depicted in FIG. 1, spring 7 is conveniently held on operating element 12 via a spring plate 8 which is urged by spring 7 against a shoulder of the transmission link 9. It is noted, however, that spring 7 can alternatively be held in any other suitable manner accomplishing a like result.

Valve system 14 can be produced in a simple manner, for example, from the valve system described in the aforementioned WABCO Westinghouse publication "Motorwagen-Bremsventil (Motor Car Braking Valve) 461 295."

Valve system 14 as shown includes a graduating piston 3 movable substantially in the longitudinal direction of transmission link 9 and biased in a direction of operating element 12 by a return spring 2, and a valve body 17 biased in a common direction by a return spring 18. Valve system 14 is connected via a supply port 16 to a pressure supply 15, and to one or more consumers 1, such as for example brake cylinders, via a delivery port 19.

The operator actuates the valve arrangment by pivotably rotating operating element 12 against the force of the spring 7. A stroke corresponding in degree to the applied rotation, in the form of substantially longitudinal displacement of transmission link 9, is transmitted to valve system 14. In response thereto, valve system 14 delivers pressure received from pressure supply 15 via supply port 16 to one or several consumers 1 via delivery port 19. The value of the delivered pressure depends upon the degree of stroke displacement of transmission link 9, which is in turn dependent upon the angle of rotation or actuating distance of operating element 12. Hence, the greater the angle of rotation or actuating distance of operating element 12, the greater the delivered pressure, up to supply pressure.

The delivered pressure present in valve system 14 acts upon the active surface of graduating piston 3 exposed thereto, producing a force within valve system 14 in opposition to the actuating force. Such pressure-induced counter force is further assisted by the biasing force of spring 7, as well as by the combined biasing forces of return spring 2 which restores graduating piston 3 and return spring 18 which restores valve body 17. These combined forces are transmitted to operating element 12 in a direction opposite the actuating force applied thereto via a control spring 4 in contact with a movable spring seat 5, and via the transmission link 9 engaged with spring seat 5.

When the operator wishes to maintain a desired angle of rotation or actuating distance of operating element 12, and thereby the corresponding value of the delivered pressure, the degree of actuating force applied to the operating element must be sufficient to overcome the pressure related force and the abovementioned aggregate of the spring biasing forces.

The description relating to the known valve systems discussed above also applies to operation and function of springs 2, 18 which restore graduating piston 3 and valve body 17 in the embodiment of FIG. 1, i.e., the combined spring-related biasing forces are low compared with the pressure-induced force in opposition to the actuating force in the depicted embodiment. The actuating force in the embodiment of FIG. 1 is therefore also essentially dependent upon the arrangement of the lever ratios and the pressure force, and further, in the embodiment, upon the spring force of the spring 7. By virtue of such arrangement, the force delivered by the spring 7 can be changed with relative ease, and hence the actuation force requirement of the system can therefore be readily changed by altering the spring force of spring 7.

This feature is especially significant when different circumstances require an adaptation of the actuation force requirement. Such circumstances may require an unaffected actuation force requirement when lever ratios are changed, in particular when the length of the actuating element is changed, or may conversely require a change in actuating force requirement when lever ratios remain unchanged.

The invention also finds utility in conjunction with valve systems in which only a slight pressure force occurs due to the small diameter of graduating piston 3 of valve system 14. Such systems are used, in particular, in applications allowing for compromises regarding the graduability of the pressure delivered by valve system 14, such as for example, in a pneumatic emergency braking circuit of an electrically controlled vehicle braking system. In such instances, spring 7 allows the actuation force requirement to be fixed for different lever ratios within a range of magnitude to which the operator is accustomed.

The spring force can be changed simply by exchanging the existing spring 7 for one with the desired force delivery. Alternatively, in an advantageous embodiment, spring 7 can be installed in an adjustable manner, an example of which is illustrated in the valve arrangement of FIG. 1. In the example shown, bearing element 10 is provided with a threaded neck 13 disposed around the passage of transmission link 9 therethrough. A spring seat 6 having inside threads for threadably engaging threaded neck 13 can be shifted longitudinally by rotation thereof. By virtue of the longitudinal shiftability of spring seat 6, the tension force of spring 7, and thereby its spring force, is continuously adjustable.

Further possibilities for the adaptation of the system to different circumstances are created through the selection or modification of the characteristic line of force/deflection of spring 7. Depending on the design of spring 7, it may have a linear or non-linear characteristic line of the force/deflection, with corresponding evolution of the actuating force acting upon the operating element 12. Often a progressive evolution of the actuating force is required. This can be achieved, or assisted in cases where control spring 4 is already progressive, through selection of spring 7 with a progressive force/deflection characteristic line.

Spring 7, which for purposes of illustration is conveniently shown in the form of a helical spring, can also have an entirely different configuration, for example provided in the form of an elastomer spring, similar to the control springs in the previously mentioned WABCO Westinghouse publications, which are incorporated herein by reference.

Figure 2:
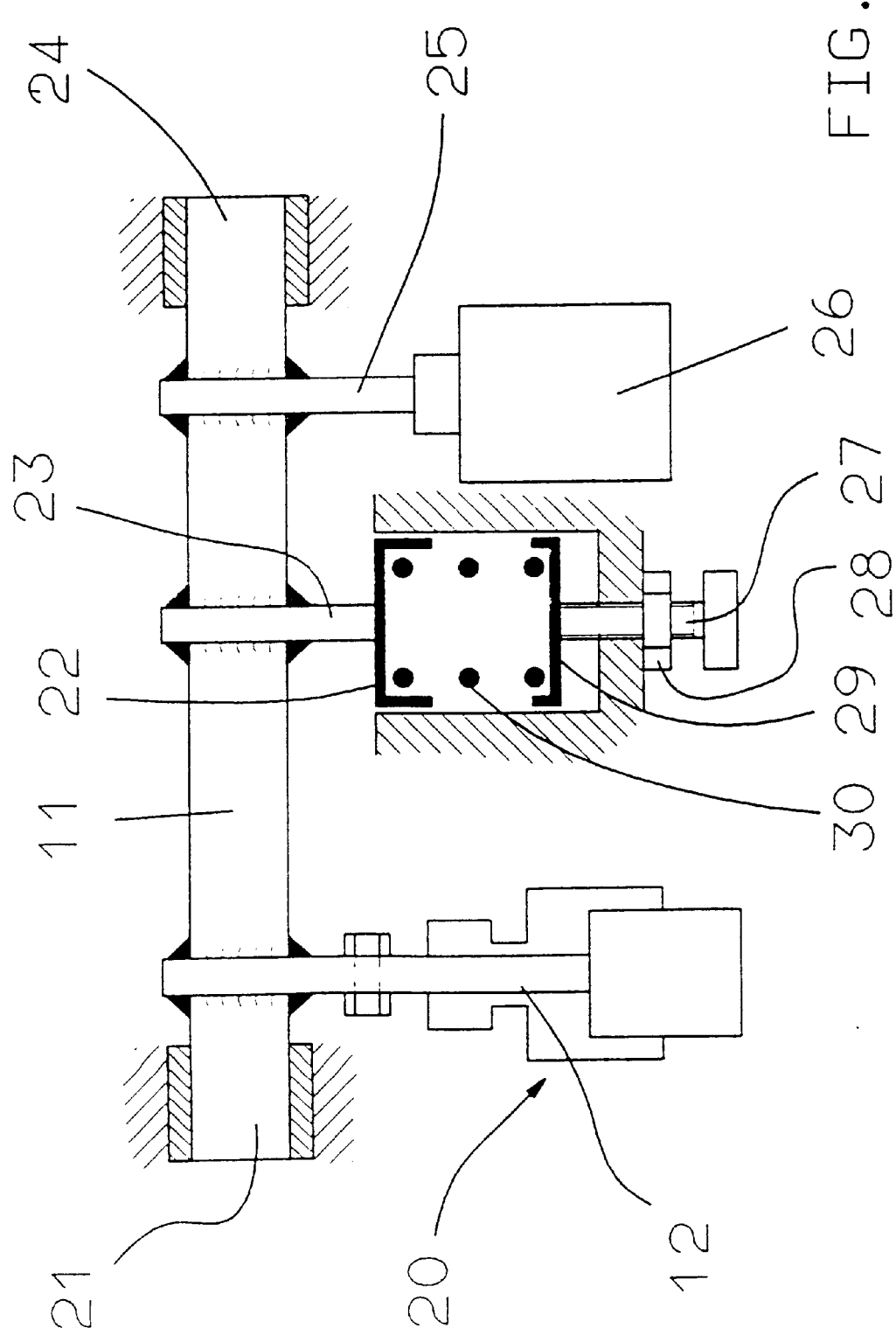
FIG. 2 is a schematic view of a valve arrangement in accordance with another embodiment of the invention.

Turning now to FIG. 2, a differently configured system is shown, depicted from the perspective as viewed by the operator. A spring 30 is located alongside operating element 12. Bearing shaft 1, which is fixedly connected to operating element 12, acts upon spring 30 by intercalation of a cup ram 22 moved via a cam 23. Spring 30 can be adjusted by means of a spring seat 29 and an adjusting screw 27 a setting of which is maintained by a lock nut 28.

A valve system, designated generally by the numeral 20, is lever-operated in this case as described in the previously mentioned WABCO Westinghouse publication "Motorwagen-Bremsventil 461 295."

Operating element 12 in the depicted valve arrangement is used for simultaneous actuation of another device 26, which, in the depicted example of FIG. 2 is an electrical brake signal transmitter of an electrically controlled vehicle braking system. Such a brake signal transmitter is described, for example, in U.S. Pat. No. 4,818,036, entitled "BRAKING POWER TRANSMITTER," issued to Reinecke on Apr. 4, 1989, and which is incorporated herein by reference.

To actuate the other device 26, an additional cam 25 permanently connected to bearing shaft 11 is installed on same.

Depending on the particular application, the other device 26 may be different than that of the example shown without departure from the contemplated scope of the invention. Furthermore, several additional devices could also be provided, in which case bearing shaft 11 would be provided with corresponding cams for operation of same. Such arrangement, however, does not necessarily require that a special cam for every other device be provided on bearing shaft 11. Rather, it is possible for the devices to be placed at an angle to each other, and the cam, distributed over its circumference, provided with a special cam contour for each of these devices.

Reference numerals 21 and 24 designate rotary bearings of bearing shaft 11.

The explanations applicable to one figure also apply generally to the remaining figure, directly or in corresponding application, to the extent that the above details are not in conflict with one another.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A valve arrangement for the delivery of pressure from a pressure supply, comprising:

a valve system for control of a delivered pressure of a pressurized medium;

an operating element upon which the delivered pressure exerts a pressure force which resists actuating force thereon, the valve system being actuated in response to said actuating force; and at least one spring arranged separately from the flow of the pressure force which exerts a spring force upon the operating element which is independent of and in addition to the pressure force, thereby assisting the pressure force, the spring force being selected such that the valve arrangement presents a predetermined actuation force requirement characteristic.

2. A valve arrangement according to claim 1, wherein the spring force is adjustable.

3. A valve arrangement according to claim 1, wherein the spring is disposed in a position in which it acts upon the operating element outside a region acted upon by the pressure force.

4. A valve arrangement according to claim 1, wherein operation of the operating element provides concomitant actuation of at least one other device.

5. A valve arrangement according to claim 4, wherein:

the valve system serves as a brake valve in a vehicle; and the at least one other device is an electrical brake signal transmitter.

6. A valve arrangement according to claim 1, wherein the spring presents a non-linear characteristic line for force/deflection.

7. A valve arrangement according to claim 6, wherein the characteristic force/deflection line of the spring is progressive.

* * * * *